(12) United States Patent
Isomura

(10) Patent No.: US 7,093,103 B2
(45) Date of Patent: Aug. 15, 2006

(54) METHOD FOR REFERRING TO ADDRESS OF VECTOR DATA AND VECTOR PROCESSOR

(75) Inventor: Masakazu Isomura, Setagaya-ku (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 10/801,642

(22) Filed: Mar. 17, 2004

(65) Prior Publication Data
US 2004/0250044 A1 Dec. 9, 2004

(30) Foreign Application Priority Data
Mar. 28, 2003 (JP) ............................. 2003-092381
Jul. 30, 2003 (JP) ............................. 2003-203856

(51) Int. Cl.
G06F 15/00 (2006.01)
G06F 12/00 (2006.01)

(52) U.S. Cl. .......................................... 712/7; 711/220

(58) Field of Classification Search ................ 711/220; 712/1–7
See application file for complete search history.

(56) References Cited

U.S. PATENT DOCUMENTS 3,827,031 A 7/1974 Kastner et al. ................ 712/7

FOREIGN PATENT DOCUMENTS

| EP | 0 227 900 A2 | 7/1987 |
|---|---|---|
| JP | A 61-211774 | 9/1986 |
| JP | A 1-173165 | 7/1989 |
| JP | A 4-343151 | 11/1992 |
| JP | A 2002-222117 | 8/2002 |
| JP | A 2003-44272 | 2/2003 |
| JP | A 2003-101415 | 4/2003 |

OTHER PUBLICATIONS

Shigeo Nagashima et al.; "Super Computer"; Ohmsha, Ltd. pp. 38 lines 3 to 7 w/partial translation.
J-L. Dekeyser et al.; "Vector addressing processor for direct and indirect accesses"; Microprocessing and Microprogramming Proc. EUROMICRO 90; No. 1/5; Aug. 30, 1990; pp. 657-664.

*Primary Examiner*—Nasser Moazzami
(74) *Attorney, Agent, or Firm*—Oliff & Berridge, PLC

(57) ABSTRACT

The object of the invention is to efficiently perform indirect index vector reference. An element register of a vector register or a scalar register specified in the "index" is divided into multiple areas, and a particular index vector is acquired by selecting any of the divided areas. Accordingly, it is possible to store substantially multiple index vectors in one vector register, and therefore register resources can be efficiently used. The procedure for providing index vectors is similar to that for providing one index vector, and therefore the code size and the process cycles of the program are almost not increased. That is, according to the present invention, indirect index vector reference can be more efficiently performed.

20 Claims, 14 Drawing Sheets

*FIG. 1A*
LS0 TYPE (BASE RELATIVE ADDRESSING)

| opecode | dst | base | offset |

*FIG. 1B*
LS1 TYPE (POST OFFSET UPDATE ADDRESSING)

| opecode | dst | base | rptamt | offset |

*FIG. 1C*
LS2 TYPE (INDEX MODIFICATION/POST REGISTER UPDATE ADDRESSING)

| opecode | dst | base | rptamt | extension | index |

FIG. 2

| extension | ADDRESS MODIFICATION METHOD |
|---|---|
| 000 | INTERPRETS THE CONTENT OF THE REGISTER SPECIFIED IN THE "INDEX" AS SIGNED AND PERFORMS ADDRESS MODIFICATION.<br>`for(t=0; t < rptamt; t++){`<br>`    targetAdrs = base.uw + index[t].h[LOWER];`<br>`}` |
| 001 | INTERPRETS THE LOWER 16 BITS OF THE REGISTER SPECIFIED IN THE "INDEX" (index[t].h[LOWER]) AS SIGNED AND PERFORMS ADDRESS MODIFICATION.<br>`for(t=0; t < rptamt; t++){`<br>`    targetAdrs = base.uw + index[t].h[LOWER];`<br>`}` |
| 010 | INTERPRETS THE UPPER 16 BITS OF THE REGISTER SPECIFIED IN THE "INDEX" (index[t].h[UPPER]) AS SIGNED AND PERFORMS ADDRESS MODIFICATION.<br>`for(t=0; t < rptamt; t++){`<br>`    targetAdrs = base.uw + index[t].h[UPPER];`<br>`}` |
| 011 | INTERPRETS EACH OF THE LOWER 16 BITS OF THE REGISTER SPECIFIED IN THE "INDEX" (index[t].h[LOWER]) AND THE UPPER 16 BITS OF THE REGISTER SPECIFIED IN THE "INDEX" (index[t].h[UPPER]) AS SIGNED AND ALTERNATELY PERFORMS ADDRESS MODIFICATION.<br>`for(t=0; t < rptamt; t++){`<br>`    if ((t & 1)==0) targetAdrs = base.uw + index[t].h[LOWER];`<br>`    else             targetAdrs = base.uw + index[t].h[UPPER];`<br>`}` |

FIG. 3

| extension | ADDRESS MODIFICATION METHOD |
|---|---|
| 000 | INTERPRETS THE CONTENT OF THE REGISTER SPECIFIED IN THE "INDEX" AS SIGNED AND UPDATES THE ADDRESS.<br>```
T = base.uw;
for(t=0; t < rptamt; t++){
   targetAdrs = T; T += index[t].w;
}
base.uw = T;
``` |
| 001 | INTERPRETS THE LOWER 16 BITS OF THE REGISTER SPECIFIED IN THE "INDEX", index[t].h[LOWER] AS SIGNED AND UPDATES THE ADDRESS.<br>```
T = base.uw;
for(t=0; t < rptamt; t++){
   targetAdrs = T; T += index[t].h[LOWER];
}
base.uw = T;
``` |
| 010 | INTERPRETS THE UPPER 16 BITS OF THE REGISTER SPECIFIED IN THE "INDEX", index[t].h[UPPER] AS SIGNED AND UPDATES THE ADDRESS.<br>```
T = base.uw;
for(t=0; t < rptamt; t++){
   targetAdrs = T; T += index[t].h[UPPER];
}
base.uw = T;
``` |
| 011 | INTERPRETS EACH OF THE LOWER 16 BITS OF THE REGISTER SPECIFIED IN THE "INDEX", index[t].h[LOWER], AND THE UPPER 16 BITS OF THE REGISTER SPECIFIED IN THE "INDEX", index[t].h[UPPER], AS SIGNED AND ALTERNATELY UPDATES THE ADDRESSES.<br>```
T = base.uw;
for(t=0; t < rptamt; t++){
   targetAdrs = T;
   if ((t & 1) == 0)   T += index[t].h[LOWER];
   else                T += index[t].h[UPPER];
}
base.uw = T;
``` |
| 100 | INTERPRETS THE CONTENT OF THE REGISTER SPECIFIED IN THE "INDEX" AS SIGNED AND UPDATES THE ADDRESS. BASE REGISTER IS NOT UPDATED.<br>```
T = base.uw;
for(t=0; t < rptamt; t++){
   targetAdrs = T; T += index[t].w;
}
``` |
| 101 | INTERPRETS THE LOWER 16 BITS OF THE REGISTER SPECIFIED IN THE "INDEX", index[t].h[LOWER] AS SIGNED, AND UPDATES THE ADDRESS. BASE REGISTER IS NOT UPDATED.<br>```
T = base.uw;
for(t=0; t < rptamt; t++){
   targetAdrs = T; T += index[t].h[LOWER];
}
``` |
| 110 | INTERPRETS THE UPPER 16 BITS OF THE REGISTER SPECIFIED IN THE "INDEX", index[t].h[UPPER] AS SIGNED, AND UPDATES THE ADDRESS. BASE REGISTER IS NOT UPDATED.<br>```
T = base.uw;
for(t=0; t < rptamt; t++){
   targetAdrs = T; T += index[t].h[UPPER];
}
``` |
| 111 | INTERPRETS EACH OF THE LOWER 16 BITS OF THE REGISTER SPECIFIED IN THE "INDEX", index[t].h[LOWER], AND THE UPPER 16 BITS OF THE REGISTER SPECIFIED IN THE "INDEX", index[t].h[UPPER], AS SIGNED AND ALTERNATELY UPDATES THE ADDRESSES. BASE REGISTER IS NOT UPDATED.<br>```
T = base.uw;
for(t=0; t < rptamt; t++){
   targetAdrs = T;
   if ((t & 1) == 0)   T += index[t].h[LOWER];
   else                T += index[t].h[UPPER];
}
``` |

FIG. 7

| extension | ADDRESS MODIFICATION METHOD |
|---|---|
| 0000 | INTERPRETS THE CONTENT OF THE REGISTER SPECIFIED IN THE "INDEX" AS SIGNED AND PERFORMS ADDRESS MODIFICATION.<br>for(t=0; t < rptamt; t++){<br>  targetAdrs = base.uw + index[t].w;<br>} |
| 0100 | INTERPRETS THE LOWER 16 BITS OF THE REGISTER SPECIFIED IN THE "INDEX" (index[t].h[LOWER]) AS SIGNED AND PERFORMS ADDRESS MODIFICATION.<br>for(t=0; t < rptamt; t++){<br>  targetAdrs = base.uw + index[t].h[LOWER];<br>} |
| 0110 | INTERPRETS THE UPPER 16 BITS OF THE REGISTER SPECIFIED IN THE "INDEX" (index[t].h[UPPER]) AS SIGNED AND PERFORMS ADDRESS MODIFICATION.<br>for(t=0; t < rptamt; t++){<br>  targetAdrs = base.uw + index[t].h[UPPER];<br>} |

*FIG. 8*

| extension | ADDRESS MODIFICATION METHOD |
|---|---|
| 0000 | INTERPRETS THE CONTENT OF THE REGISTER SPECIFIED IN THE "INDEX" AS SIGNED AND UPDATES THE ADDRESS.<br>`T = base.uw;`<br>`for(t=0; t < rptamt; t++){`<br>`   targetAdrs = T; T += index[t].w;`<br>`}`<br>`base.uw = T;` |
| 0100 | INTERPRETS THE LOWER 16 BITS OF THE REGISTER SPECIFIED IN THE "INDEX",<br>index[t].h[LOWER] AS SIGNED, AND UPDATES THE ADDRESS.<br>`T = base.uw;`<br>`for(t=0; t < rptamt; t++){`<br>`   targetAdrs = T; T += index[t].h[LOWER];`<br>`}`<br>`base.uw = T;` |
| 0101 | THE SAME AS ABOVE. BASE REGISTER IS NOT UPDATED, HOWEVER.<br>`T = base.uw;`<br>`for(t=0; t < rptamt; t++){`<br>`   targetAdrs = T; T += index[t].h[LOWER];`<br>`}` |
| 0110 | INTERPRETS THE UPPER 16 BITS OF THE REGISTER SPECIFIED IN THE "INDEX",<br>index[t].h[UPPER] AS SIGNED, AND UPDATES THE ADDRESS.<br>`T = base.uw;`<br>`for(t=0; t < rptamt; t++){`<br>`   targetAdrs = T; T += index[t].h[UPPER];`<br>`}`<br>`base.uw = T;` |
| 0111 | THE SAME AS ABOVE. BASE REGISTER IS NOT UPDATED, HOWEVER.<br>`T = base.uw;`<br>`for(t=0; t < rptamt; t++){`<br>`   targetAdrs = T; T += index[t].h[UPPER];`<br>`}` |
| 1100 | INTERPRETS ANY DATA OF THE LOWER 16 BITS index[t].h[LOWER] AND THE UPPER 16 BITS<br>index[t].h[UPPER] OF THE REGISTER SPECIFIED IN THE "INDEX", AND THE LOWER 16 BITS<br>SR30.h[LOWER] AND THE UPPER 16 BITS SR30.h[UPPER] OF THE REGISTER A AS SIGNED,<br>AND ALTERNATELY UPDATES THE ADDRESSES.<br>`T = base.uw;`<br>`for(t=0; t < rptamt; t++){`<br>`   targetAdrs = T;`<br>`   switch((ISW.h[LOWER] >> (2 * t)) & 0x3){`<br>`   case 0:  T += index.h[LOWER]; break;`<br>`   case 1:  T += index.h[UPPER]; break;`<br>`   case 2:  T +=SR30.h[LOWER]; break;`<br>`   case 3:  T +=SR30.h[UPPER]; break;`<br>`   }`<br>`}`<br>`base.uw = T;` |
| 1101 | THE SAME AS ABOVE. BASE REGISTER IS NOT UPDATED, HOWEVER.<br>`T = base.uw;`<br>`for(t=0; t < rptamt; t++){`<br>`   targetAdrs = T;`<br>`   switch((ISW.h[UPPER] >> (2 * t)) & 0x3){`<br>`   case 0:  T += index.h[LOWER]; break;`<br>`   case 1:  T += index.h[UPPER]; break;`<br>`   case 2:  T +=SR30.h[LOWER]; break;`<br>`   case 3:  T +=SR30.h[UPPER]; break;`<br>`   }`<br>`}` |
| 1110 | INTERPRETS ANY DATA OF THE LOWER 16 BITS index[t].h[LOWER] AND THE UPPER 16 BITS<br>index[t].h[UPPER] OF THE REGISTER SPECIFIED IN THE "INDEX", AND THE LOWER 16 BITS<br>SR31.h[LOWER] AND THE UPPER 16 BITS SR31.h[UPPER] OF THE REGISTER B AS SIGNED<br>AND ALTERNATELY UPDATES THE ADDRESSES.<br>`T = base.uw;`<br>`for(t=0; t < rptamt; t++){`<br>`   targetAdrs = T;`<br>`   switch((ISW.h[LOWER] >> (2 * t)) & 0x3){`<br>`   case 0:  T += index.h[LOWER]; break;`<br>`   case 1:  T += index.h[UPPER]; break;`<br>`   case 2:  T +=SR31.h[LOWER]; break;`<br>`   case 3:  T +=SR31.h[UPPER]; break;`<br>`   }`<br>`}`<br>`base.uw = T;` |
| 1111 | THE SAME AS ABOVE. BASE REGISTER IS NOT UPDATED, HOWEVER.<br>`T = base.uw;`<br>`for(t=0; t < rptamt; t++){`<br>`   targetAdrs = T;`<br>`   switch((ISW.h[UPPER] >> (2 * t)) & 0x3){`<br>`   case 0:  T += index.h[LOWER]; break;`<br>`   case 1:  T += index.h[UPPER]; break;`<br>`   case 2:  T +=SR31.h[LOWER]; break;`<br>`   case 3:  T +=SR31.h[UPPER]; break;`<br>`   }`<br>`}` |

METHOD FOR REFERRING TO ADDRESS OF VECTOR DATA AND VECTOR PROCESSOR

BACKGROUND OF THE INVENTION

1. Field of the Invention

The present invention relates to a method for referring to an address used for reading or writing vector data, and a vector processor.

2. Description of the Related Art

Traditionally, data on memory is irregularly read or written in image processing and the like, and there are proposed various methods for efficiently performing such processing.

For example, in image processing, when storing a particular block of data of an image data from memory in a register, pixel data for a line of the block is stored in the register, and then an address on the memory which is separated from the address of the data by a predetermined length is referred to in order to read pixel data for the next line of the block.

As a method for referring to such a complicated address, a technique described in a reference document, "SuperComputer" (by Shigeo Nagashima and Yoshikazu Tanaka; Ohmsha, Ltd.) is known.

In this reference document, a technique is disclosed wherein indirect index vector reference is used when reading multi-dimensional array data from memory into a vector register or writing it from the vector register to the memory.

The indirect index vector reference is a method in which lists (index vectors) storing the order of addresses on memory to are referred to are supplied, and a particular address on the memory is indirectly referred to by referring to the lists in sequence.

By using such indirect index vector reference, it is possible to perform complicated address reference on memory.

(Non-Patent Document 1)

"Super Computer" by Shigeo Nagashima and Yoshikazu Tanaka; Ohmsha, Ltd.; pp. 35–41

In prior-art techniques, however, it is necessary to store an index vector in a vector register, and this causes the following problems. First, since a procedure for supplying an index vector is required, the code size and the number of process cycles of the program are increased.

Second, as the number of index vectors to be provided increases, the number of vector registers for storing the index vectors also increases, thereby causing shortage of the number of register resources to be used for the original operation and therefore causing decrease in the efficiency of the operation.

The object of the present invention is to efficiently perform indirect index vector reference.

SUMMARY OF THE INVENTION

To achieve the above object, the present invention is:

a method for referring to an address of vector data, the method being for referring to a memory address to read or write vector data with the use of an index vector, wherein an element storage register for storing an element of the index vector (for example, a register storing an index vector in the register file 40 in FIG. 4) is divided into multiple areas; a particular code is stored in each of the areas (for example, a upper and lower areas); and multiple index vectors may be generated with the use of the code stored in a particular area of each element storage register of the index vector.

For example, any of the divided areas of an index register is selected with the use of the "extension" in an instruction code in the detailed description of the preferred embodiments. An element of an index vector is determined by the code of the selected area to generate an index vector specifying a particular memory address.

Furthermore, each area of the element storage register stores a code indicating a relative address to a reference base address (for example, abase address) of the index vector; and a target address (a reference address on memory), a memory address to be referred to, is calculated based on the code (for example, upper sixteen bits and lower sixteen bits) in an area selected from the divided areas of each element storage register and the base address.

This method relates to the index modification addressing in the detailed description of the preferred embodiments.

Which divided area of the element storage register should be selected can be specified in an instruction code or specified by inputting a specification pattern for specifying an area to be selected, which has been stored in a register and the like.

Furthermore, the index vector is stored in a vector register, and a code indicating the relative address is stored in each area obtained by dividing each element register of the vector register.

Furthermore, each area of the element storage register stores a code indicating a relative address to a reference base address of the index vector; and a target address, a memory address to be referred to, is calculated based on the code in an area selected from the divided areas of each element storage register and the base address, and the calculated target address is set as a new reference base address.

This method relates to the post register update addressing in the detailed description of the preferred embodiments.

Furthermore, a code indicating the relative address is stored in a scalar register as the element storage register, and the code indicating the relative address is stored in each area of the scalar register.

Furthermore, the area to be selected from the divided areas is dynamically changed during execution of a vector instruction for reading or writing of the vector data.

Furthermore, a specification pattern for specifying the area to be selected from the divided areas of the element storage register is stored in a predetermined register, and a particular index vector is generated by specifying any of the divided areas based on the specification pattern.

Furthermore, a first register including the element storage register storing a first index vector element (for example, an "index register" in the embodiments of the invention) and a second register including the element storage register storing a second index vector element (for example, subindex registers 141 and 142 in FIG. 9) are provided, and multiple index vectors may be generated with the use of the code stored in a particular area of each of the first and second registers.

Furthermore, the present invention is:

a vector processor for referring to a memory address to read or write vector data with the use of an index vector, the vector processor comprising: an element storage register for storing an element of an index vector (for example, an element register of an "index register" in the embodiments of the invention); wherein the element storage register is divided into multiple areas, and a particular code is stored in each of the areas; and multiple index vectors may be generated with the use of the code stored in a particular area of each element storage register.

Furthermore, a first register including the element storage register storing a first index vector element (for example, the "index register" in the embodiments of the invention) and a second register including the element storage register storing a second index vector element (for example, the subindex registers 141 and 142 in FIG. 9) are provided, and multiple index vectors may be generated with the use of the code stored in a particular area of each of the first and second registers.

In this case, which divided area of the element storage register of the first and second registers should be selected can be specified in an instruction code or specified by inputting a specification pattern for specifying an area to be selected, which has been stored in a register and the like.

According to the present invention, an element register of a vector register or a scalar register is divided into multiple areas, and a particular code to be an element of an index vector is stored in each area. And then, any divided area is selected, and a particular index vector is acquired using the code stored in the area.

Thus, it is possible to store substantially multiple index vectors in a register area for storing one index vector, and therefore register resources can be efficiently used.

BRIEF DESCRIPTION OF THE DRAWINGS

FIGS. 1A to 1C show formats of a load instruction or a store instruction;

FIG. 2 shows correspondence relationships between codes shown by the "extension" and extended specifications for address modification in the case of index modification addressing;

FIG. 3 shows correspondence relationships between codes shown by the "extension" and extended specifications for address modification in the case of post register update addressing;

FIG. 7 shows correspondence relationships between codes shown by the "extension" and the extended specifications for address modification in the case of index modification addressing;

FIG. 8 shows correspondence relationships between codes shown by the "extension" and extended specifications for address modification in the case of post register update addressing;

DETAILED DESCRIPTION OF THE PREFERRED EMBODIMENTS

Figure 4:
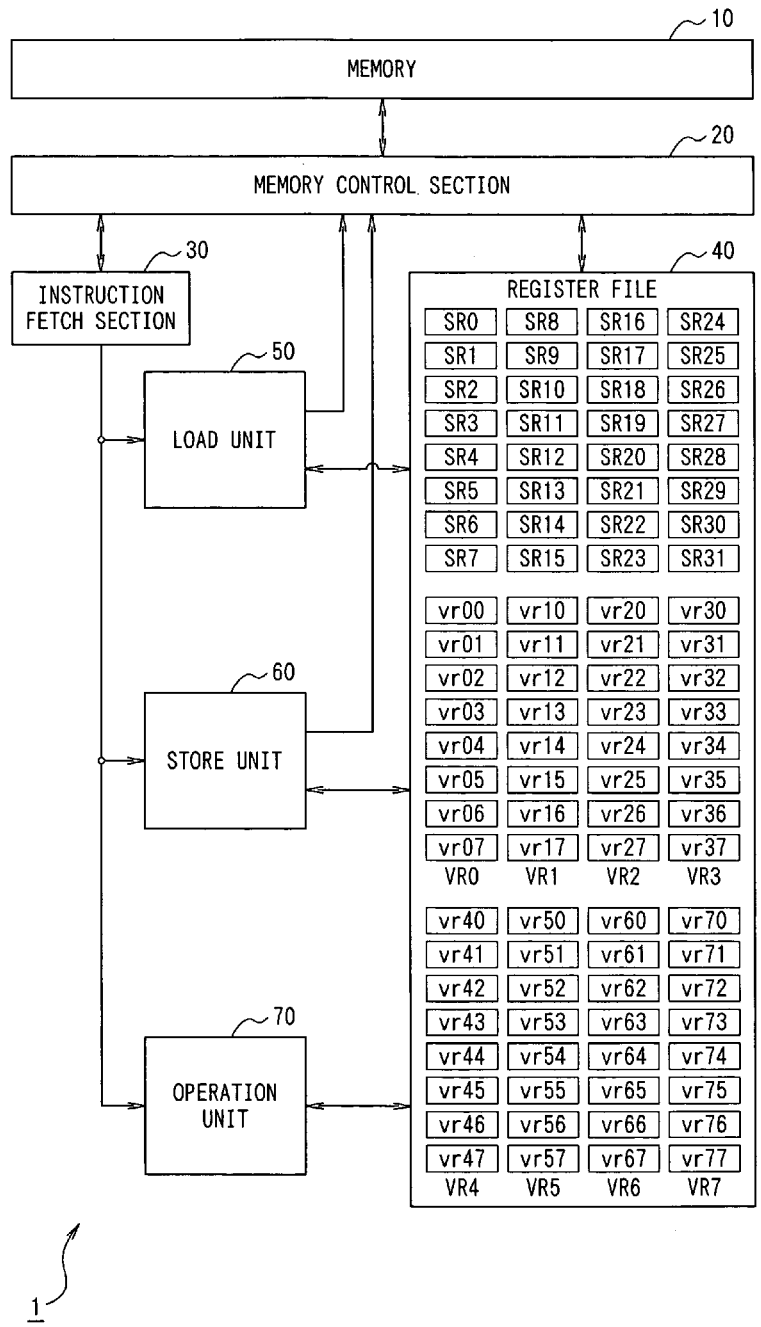
FIG. 4 shows the configuration of a vector processor 1 according to the embodiment.

Description will be made below on embodiments of a vector processor according to the present invention with reference to figures.

First Embodiment

In a vector processor according to the present invention, an element register of a vector register or a scalar register for storing an index vector is divided for use to extend the addressing feature.

First, the basic idea for realizing such a addressing feature will be described. Since the present invention relates to a load instruction and a store instruction in a vector processor, description will be made, focusing thereon.

The following three types are specified as the code types of a load instruction and a store instruction in a vector processor according to addressing modes (methods for referring to an address).

FIGS. 1A to 1C show formats of a load instruction or a store instruction. The FIGS. 1A to 1C show an LS0 type applicable to base relative addressing, an LS1 type applicable to post offset update addressing and an LS2 type applicable to index modification addressing and post register update addressing, respectively.

In FIGS. 1A to 1C, the LS0 type applies to a load instruction and a store instruction for scalar data, and the LS1 and LS2 types apply to a load instruction and a store instruction for scalar data and vector data.

The present invention handles a load instruction and a store instruction for vector data and relates to index modification addressing and post register update addressing. Therefore, description will be made on the LS2 type.

In FIG. 1C, the LS2 type format includes six fields, that is, "opcode", "destination (dst)", "base", "repeat amount (rptamt)", "extension" and "index".

The "opcode" is a field to show the content of the instruction and includes a code indicating either a load instruction or a store instruction.

The "destination" is a field to specify the address of the register where data to be loaded or stored is stored, that is, the address of the register to which data read from memory is to be written in the case of a load instruction, and the address of the register from which data to be written to memory is read in the case of a store instruction.

The "base" is a field to specify the address of the register where the memory address used as a basis is stored.

The "repeat amount" is a field to show the number of repetitions of a vector instruction (the number of element data). If the number of repetition of the instruction is "1", the instruction is a scalar instruction, and otherwise the instruction is a vector instruction.

The "extension" is a five-bit field supplied for extending a addressing feature. In the present invention, an address of a divided element register is specified with the use of the "extension" as described later.

The "index" is a field to show what modification is to be performed for the address shown in the "base", that is, the order of addresses to be referred to from the address shown in the "base". In the present invention, extended specifications for address modification is specified by utilizing the "index", as described later.

The "index" specifies a vector register or a scalar register where the above-mentioned index vector is stored (hereinafter, the register where an index vector is stored is referred to as an "index register"). By referring to the "index", indirect index vector reference is performed.

Extended specifications for address modification according to the present invention will be now specifically described.

FIG. 2 shows correspondence relationships between codes to be shown in the "extension" and extended specifications for address modification in the case of the index modification addressing. In FIG. 2, programming examples in a description style based on the C language are attached to explain the extended specifications for address modifications. The same goes for FIG. 3 to be described later.

In FIG. 2, if the "extension" is "000", the content (index vector) of the register specified in the "index" (an index register) is interpreted as signed to perform address modification.

Specifically, the value of the register shown in the "base" is always regarded as the basis, and the address shown in the "index" is sequentially added to the value to perform address modification.

If the "extension" is "001", the lower sixteen bits of the register specified in the "index" is interpreted as signed to perform address modification.

If the "extension" is "010", the upper sixteen bits of the register specified in the "index" is interpreted as signed to perform address modification.

Furthermore, if the "extension" is "011", each of the lower sixteen bits and upper sixteen bits of the register specified in the "index" is interpreted as signed to perform address modification alternately using any of the sixteen bits. Specifically, if the execution number in repetition of a vector instruction is an even number, then address modification is performed with the lower sixteen bits, and in the case of an odd number, address modification is performed with the upper sixteen bits.

Extended specifications for the post register update addressing will be now described.

FIG. 3 shows correspondence relationships between codes shown in the "extension" and extended specifications for address modification in the case of the post register update addressing.

In FIG. 3, if the "extension" is "000", the content of the register specified in the "index" is interpreted as signed to perform address modification.

Specifically, the value of a register specified in the "base" is stored in a predetermined register (a register for storing the value of a parameter T shown in FIG. 3) once, and by updating the value of the register, address modification is performed.

If the "extension" is "001", the lower sixteen bits of the register specified in the "index" is interpreted as signed to perform address modification.

If the "extension" is "010", the upper sixteen bits of the register specified in the "index" is interpreted as signed to update the address.

Furthermore, if the "extension" is "011", each of the lower sixteen bits and the upper sixteen bits of the register specified in the "index" is interpreted as signed to update the address alternately using any of the sixteen bits.

In this case, when the "extension" is between "000" and "011", address modification is performed based on the content specified in the "index" while the instruction is repeated the number of times specified in the vector instruction; and the value of the register specified in the "base" is updated when the repetition number is completed.

Thus, when repeatedly performing loading or storage using multiple load instructions or store instructions, the register specified in the "base" is automatically updated. Therefore, it is not necessary to update the address in the "base" with a different instruction each time an instruction is issued, and the instruction can be immediately executed.

In FIG. 3, when the "extension" is between "100" and "111", the address is similarly updated as done when the "extension" is between "000" and "011", respectively. However, if the extension is between "100" and "111", then execution of the instruction is finished without updating the value of the register specified in the "base", after the instruction repetition number has been completed.

Description will be now made on a vector processor according to this embodiment.

FIG. 4 shows the configuration of a vector processor 1 according to this embodiment.

In FIG. 4, the vector processor 1 is configured to include a memory 10, a memory control section 20, an instruction fetch section 30, a register file 40, a load unit 50, a store unit 60 and an operation unit 70.

The memory 10 stores instruction codes given to the vector processor 1 and data to be processed.

The memory control section 20 controls access to the memory 10, that is, reading/writing of data from/to the memory 10. For example, the memory control section 20 reads data from the address of the memory 10 specified by the load unit 50 or the store unit 60, or outputs data read from the memory 10 to the register file 40.

The instruction fetch section 30 fetches an instruction code from the memory 10 via the memory control section 20 and temporarily stores it.

The register file 40 is configured to include thirty-two scalar registers SR0 to SR31 and eight vector registers VR0 to VR7 each of which consists of eight element registers, and temporarily stores data read from the memory 10 and operation results. In the description below, it is assumed that each element register of the vector register and each scalar register are thirty-two bits wide.

If the instruction code stored in the instruction fetch section 30 is a load instruction, the load unit 50 reads an instruction code or data from the memory 10.

If the instruction code stored in the instruction fetch section 30 is a store instruction, the store unit 60 writes data to the memory 10.

If the instruction code stored in the instruction fetch section 30 is a predetermined operation instruction, the operation unit 70 performs operation on particular data stored in the register file 40.

The configuration of the load unit 50 will be now described in detail.

Figure 5:
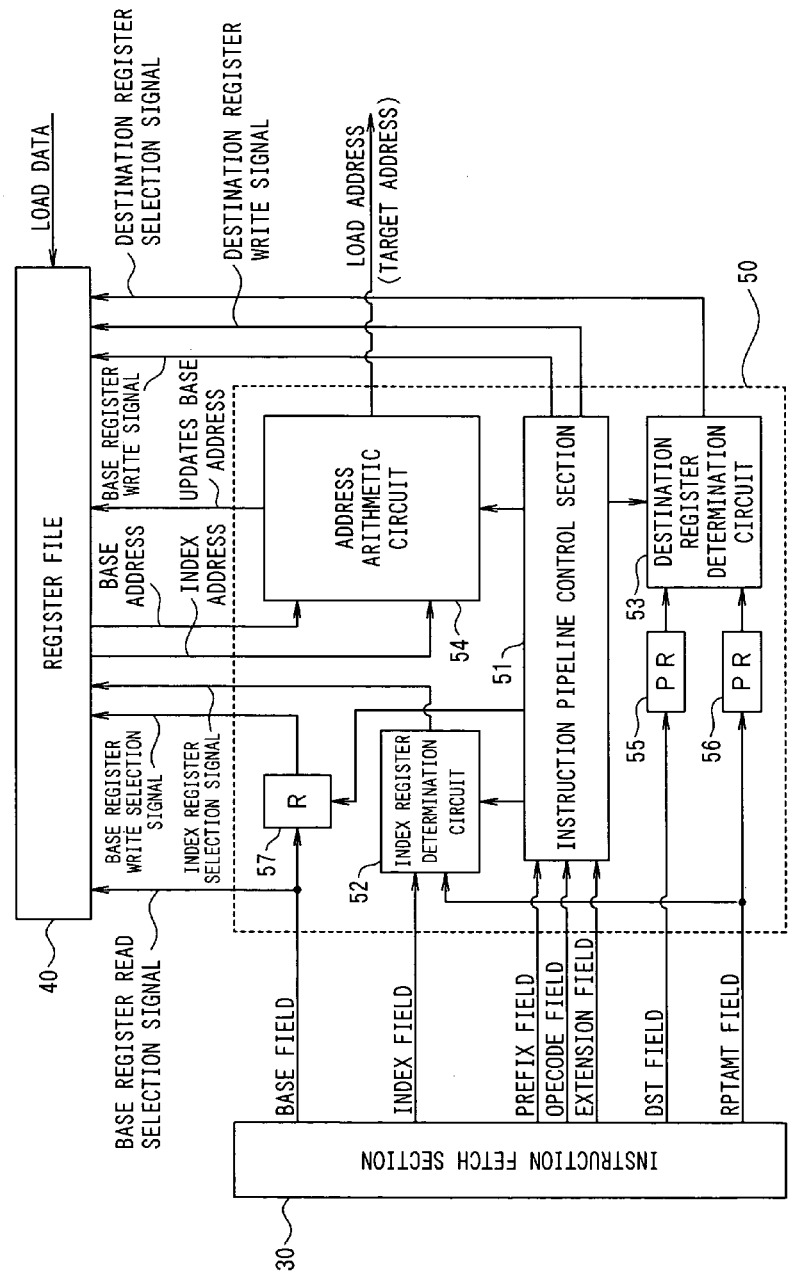
FIG. 5 is a block diagram showing the internal configuration of a load unit 50.

FIG. 5 is a block diagram showing the internal configuration of the load unit 50.

In FIG. 5, the load unit 50 is configured to include an instruction pipeline control section 51, an index register determination circuit 52, an destination register determination circuit 53, an address arithmetic circuit 54, pipeline registers (PR) 55 and 56, and a register 57.

The instruction pipeline control section 51 controls the entire load unit 50.

The index register determination circuit 52 generates a signal for selecting an index register in which an index vector is stored (an index register selection signal) based on the index field of an instruction code.

In the case of the index modification addressing, an address specified as a basis (a base address) is retained, and a reference address is generated by specifying a relative address of each element to the address. That is, since a relative address is specified for each element in the case of the index modification addressing, a vector register is specified as an index register.

In the case of the post register update addressing, the address specified as a basis (a base address) is regarded as a reference address, and the base address is updated by specifying a relative address to the base address. By repeating specification of a relative address of the next element, to the updated base address, a reference address is generated. Therefore, in the case of the post register update addressing, both of a scalar register and a vector register can be specified as an index register.

The destination register determination circuit 53 generates a signal for selecting a destination register in which a destination address is to be stored (a destination register selection signal) based on the destination field and the repeat amount field of an instruction code.

The address arithmetic circuit 54 calculates an address on the memory 10 to be targeted by a load instruction (a load address) from the base address and an index address (an address specified in the "index") inputted from the register file 40, based on a direction by the instruction pipeline control section 51.

The PRs 55 and 56 temporarily store the codes of the destination field and the repeat amount field inputted by the instruction fetch section 30, causes them to be one cycle delayed in pipeline processing, and outputs them to the destination register determination circuit 53.

The register 57 temporarily stores the code of the base field inputted by the instruction fetch section 30.

The configuration of the address arithmetic circuit 54 in FIG. 5 will be now described.

Figure 6:
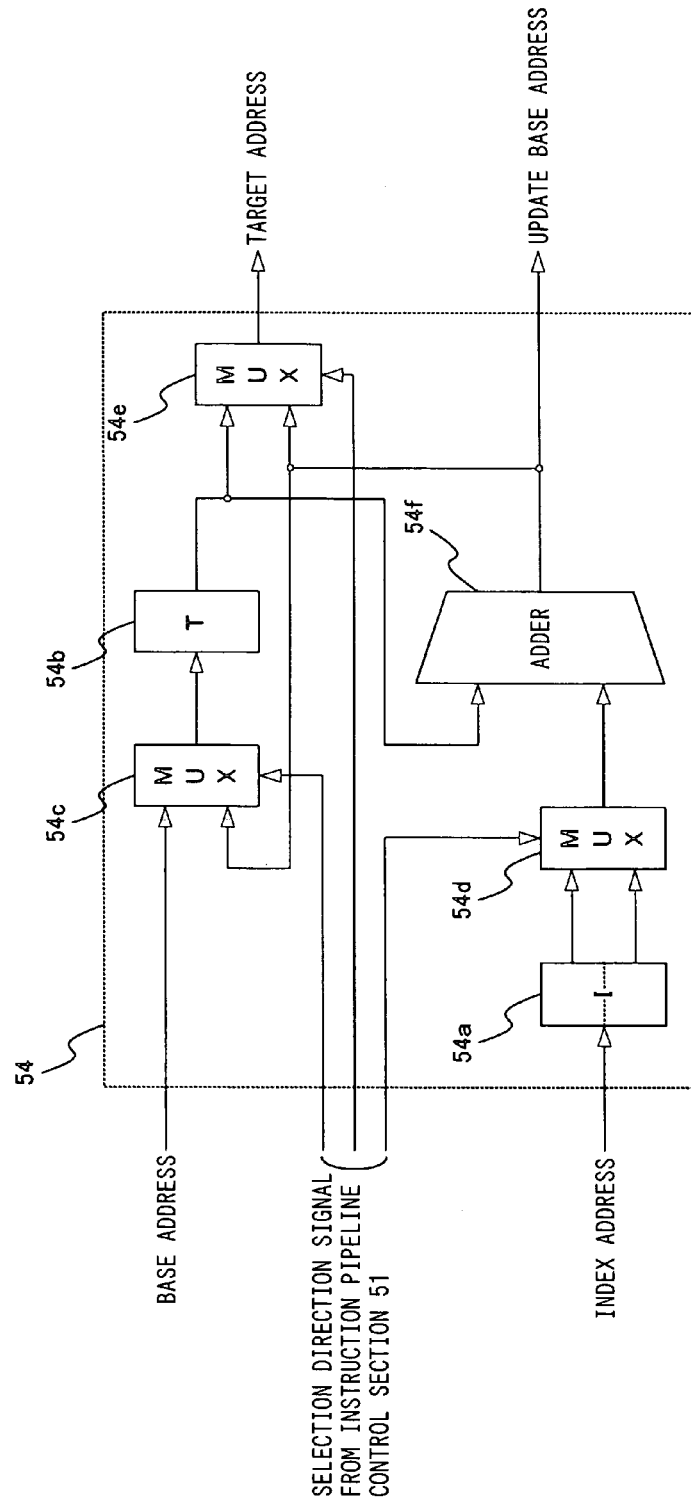
FIG. 6 shows a configuration example of an address arithmetic circuit 54.

FIG. 6 shows a configuration example of the address arithmetic circuit 54.

In FIG. 6, the address arithmetic circuit 54 is configured to include an I register 54a, a T register 54b, multiplexers (MUXs) 54c to 54e and an adder 54f.

The I register 54a temporarily stores an index address inputted from the register file 40.

The T register 54b temporarily stores the base address inputted from the register file 40 via the MUX 54c.

The MUX 54c switches between the base address inputted from the register file 40 and an update base address outputted from the adder 54f, and outputs any of them to the T register 54b.

The MUX 54d selects either the upper address or the lower address of the index address inputted from the I register 54a and outputs it to the adder 54f.

The MUX 54e switches between the base address inputted from the T register 54b and the update base address outputted from the adder 54f, and outputs any of them as a target address at which a load instruction is executed in each repetition of a vector instruction.

The adder 54f adds the base address value inputted from the T register 54b and the address based on either the upper or lower data of the index address inputted from the MUX 54d and outputs it as an update base address (the value of the updated base address).

In FIG. 6, the MUXs 54c to 54e are controlled by the instruction pipeline control section 51. That is, a signal for selecting any of inputted data (a selection direction signal) is inputted to the MUXs 54c to 54e from the instruction pipeline control section 51.

The address arithmetic circuit 54 performs a predetermined operation appropriate for each of the index modification addressing and the post update addressing.

Operations will be now described.

The operation of the entire vector processor 1 will be described first with reference to FIG. 4.

When the vector processor 1 performs processing, an instruction code is read into the instruction fetch section 30 from the memory 10 via the memory control section 20.

The instruction code is outputted from the instruction fetch section 30 to each of the load unit 50, the store unit 60 and the operation unit 70.

When the instruction code is inputted, each of the load unit 50, the store unit 60 and the operation unit 70 decodes the instruction code, and executes the instruction only when the instruction is relevant to the unit.

Here, description will be made on the case where the instruction code is a load instruction with reference to FIG. 5.

When the "opcode" of the instruction code indicates a load instruction (more specifically, when the prefix code is "000"), the load unit 50 operates.

The load unit 50 outputs the code of the base field received from the instruction fetch section 30 to the register file 40 as a base register read selection signal (a signal for selecting the base register to read data). The base register read selection signal is a signal for selecting any of the scalar registers SR0 to SR31 in the register file 40 as a base register.

The base address value stored in the register specified by the base register read selection signal is inputted to the load unit 50, from the register file 40 which has received the base register read selection signal.

The base address value inputted from the register file 40 is inputted to the address arithmetic circuit 54.

The index register determination circuit 52 receives the codes of the index field and the repeat amount field inputted by the instruction fetch section 30. The index register determination circuit 52 judges whether the instruction code is a vector instruction or a scalar instruction based on the direction from the instruction pipeline control section 51. If the instruction code is a vector instruction, the index register determination circuit 52 sequentially outputs the same number of index register selection signals as the number of element data shown by the "repeat amount", to the register file 40. In this case, if the register specified by the index register selection signal is a vector register, then predetermined selection signals for identifying respective element registers in the specified vector register are outputted.

From the register file 40 to which the index register selection signals have been inputted, the index address values from the registers indicated by the index register selection signals are sequentially inputted to the address arithmetic circuit 54.

Receiving the index address value, the address arithmetic circuit 54 calculates a load address based on the base address value and the index address value and outputs it to the memory control section 20. The operation of the address arithmetic circuit 54 will be described later.

The codes of the destination field and the repeat amount field inputted by the instruction fetch section 30 are stored in the PRs 55 and 56 once to adjust timing in pipeline processing, and then inputted to the destination register determination circuit 53.

The destination register determination circuit 53 then outputs destination register selection signals to the register file 40 in synchronization with the data loaded from the memory 10.

In the register file 40, the data loaded from the memory 10 is then sequentially stored in predetermined destination registers.

Furthermore, in the case of the post register update addressing, an update base address outputted from the address arithmetic circuit 54 is written to the base register.

Thus, the code of the base field is stored in the register 57; the code outputted from the register 57 is used as a base register write selection signal (a signal for selecting the base register to write data); and the data of the base register is updated in response to input of abase register write signal (a signal for directing writing to the base register).

The operation of the address arithmetic circuit 54 will be now described.

Description will be now made on the case of the index modification addressing first.

In the index modification addressing, the base address value is stored in the T register 54b via the MUX 54c in the cycle "1".

The index address value is stored in the I register 54a.

In the cycle "2", the adder 54f adds the base address value in the T register 54b and the address value shown by either the upper or lower half of the I register 54a, and the result is outputted as a target address (a load address) via the MUX 54e.

In and after the third cycle, while the base address value is retained in the T register 54b, index addresses are newly inputted, and addition thereof with the base address is sequentially performed by the adder 54f.

The instruction pipeline control section 51, to which the code of the extension field has been inputted, controls the MUX 54d then to realize the extended specifications for index modification addressing shown in FIG. 2.

That is, if the "extension" is "000", the data stored in the I register 54a (thirty-two bit data, here) is immediately inputted to the adder 54f.

If the "extension" is "001", then the lower sixteen bits of the I register 54a is sign-extended, and the obtained thirty-two bit data is inputted to the adder 54f.

If the "extension" is "010", then the upper sixteen bits of the I register 54a is sign-extended, and the obtained thirty-two bit data is inputted to the adder 54f.

Furthermore, if the "extension" is "011", then the lower sixteen bits and the upper sixteen bits of the I register 54a are alternately selected each one cycle, and sign-extended thirty-two bit data is inputted to the adder 54f.

Description will be now made on the case of the post register update addressing.

In the case of the post register update addressing, the base address value is stored in the T register 54b via the MUX 54c in the cycle "1".

The index address value is stored in the I register 54a.

In the cycle "2", the base address value in the T register 54b is immediately outputted as a target address (a load address) via the MUX 54e.

The base address value in the T register 54b is also outputted to the adder 54f at the same time, and added with the index address value stored in the I register 54a.

The result of the addition by the adder 54f is then stored in the T register 54b via the MUX 54c, and the value stored in the T register 54b as a base address is updated.

In and after the third cycle, index addresses are newly inputted, and the output from the T register 54b is outputted as a target address and the value stored as a base address in the T register 54b is updated similar to the cycles "1" and "2".

After that, at the same time when the target address for the last element data targeted by the load instruction being executed is outputted, the output from the adder 54f is outputted to the register file 40 as an update base address.

In the register file 40, at the time specified by a base register write signal, the update base address is stored in a register specified by a base register write selection signal inputted together with the base write signal.

The instruction pipeline control section 51 to which the code of the extension field has been inputted controls the MUX 54d then to realize the extended specifications for the post register update addressing shown in FIG. 3.

That is, if the "extension" is "000", then the data stored in the I register 54a (thirty-two bit data, here) is immediately inputted to the adder 54f.

If the "extension" is "001", then the lower sixteen bits of the I register 54a is sign-extended, and the obtained thirty-two bit data is inputted to the adder 54f.

If the "extension" is "010", then the upper sixteen bits of the I register 54a is sign-extended, and the obtained thirty-two bit data is inputted to the adder 54f.

If the "extension" is "011", then the lower sixteen bits and the upper sixteen bits of the I register 54a are alternately selected each one cycle, and sign-extended thirty-two bit data is inputted to the adder 54f.

If the "extension" is between "100" and "111", the feature extension is similarly performed as done when the "extension" is between "000" and "011", respectively. However, the instruction pipeline control section 51 does not output a base register write signal and controls update of the base register not to be done.

As described above, in the vector processor 1 according to this embodiment, an element register of a vector register or a scalar register specified in the "index" is divided into multiple areas, and a particular index vector is acquired by selecting any of the divided areas.

Thus, it is possible to store substantially multiple index vectors can be stored in one vector register, and therefore register resources can be efficiently used.

The procedure for preparing index vectors is similar to that for preparing one index vector, and therefore the code size and the process cycles of the program are almost not increased.

Furthermore, in the post register update addressing, a scalar register is specified as an index register; the register is divided into multiple areas; and a predetermined index vector is acquired by selecting any of the divided areas.

While, in the case of using a vector register as an index register, subsequent processing cannot be started after data has been stored in all the vector registers, in the case of using a scalar register, subsequent processing can be started immediately after data is stored in the scalar register.

Accordingly, the procedure for preparing index vectors is reduced, and it is possible to decrease the code size and the number of process cycles of the program.

That is, according to the present invention, indirect index vector reference can be more efficiently performed.

Though it has been described in this embodiment that a register is divided into upper and lower areas for use in order to extend the addressing feature, it is also possible to divide a register into more than two areas.

Furthermore, though it has been described in this embodiment that the address of an element register is fixedly specified (specification of a single register, alternate specification between two registers, etc.) by the "extension" included in an instruction code, for the whole instruction, it is also possible to dynamically change the pattern of specifying an element register during execution of an instruction. That is, the data length of the "extension" is too limited to specify a complicated pattern, and therefore means capable of inputting a complicated specification pattern may be provided to enable specification of a more complicated pattern than a pattern specifiable by the "extension". It is also possible to input a different specification pattern for specifying an element register during execution of an instruction.

Second Embodiment

A vector processor according to this embodiment is the vector processor according to the first embodiment, wherein the extended specifications for address modification shown in FIGS. 2 and 3 are further developed.

Specifically, a code for extending the addressing feature is included in an instruction code; divided areas of an index register are variously specified; and in addition, two specifiable registers for storing index vectors for extending the addressing feature (hereinafter referred to as "subindex registers A and B") are further provided. By specifying an address modification method with four bits of the "extension" of an instruction code, various address modifications are available.

Description will be made on the extended specifications for a vector processor according to this embodiment in detail first.

FIG. 7 shows correspondence relationships between codes shown by the "extension" and the extended specifications for address modification in the case of the index modification addressing. In FIG. 7, programming examples in a description style based on the C language are attached to explain the extended specifications for address modifications. The same goes for FIG. 8 to be described later.

In FIG. 7, if the "extension" is "0000", the content (an index vector) of the register specified in the "index" is interpreted as signed to perform address modification.

Specifically, the value of the register shown in the "base" is always regarded as the basis, and the address shown in the "index" is sequentially added to the value to perform address modification.

If the "extension" is "0100", the lower sixteen bits of the register specified in the "index" is interpreted as signed to perform address modification.

If the "extension" is "0110", the upper sixteen bits of the register specified in the "index" is interpreted as signed to perform address modification.

The extended specifications for the post register update addressing will be now described.

FIG. 8 shows correspondence relationships between codes shown by the "extension" and extended specifications for address modification in the case of the post register update addressing.

In FIG. 8, if the "extension" is "0000", "0100", "0101", "0110" or "0111", the address is similarly updated as done when the "extension" is "000", "001", "101", "010" or "110" in FIG. 3, respectively.

If the "extension" is "1100", in the index register specified in the "index" and the subindex register A, either the lower sixteen bits or the upper sixteen bits is interpreted as signed to update the address. In this case, either the upper sixteen bits or the lower sixteen bits of the index register and the subindex register A is specified based on the specification pattern stored in a predetermined register (hereinafter referred to as an "index switch register").

Specifically, the value of a register specified in the "base" is stored in a predetermined register (a register for storing the value of a parameter T shown in FIG. 8) once, and by updating the value of the register, address modification is performed.

If the "extension" is "1110", in the index register specified in the "index" and the subindex register B, either the lower sixteen bits or the upper sixteen bits is interpreted as signed to update the address. In this case, either the upper sixteen bits or the lower sixteen bits of the index register and the subindex register B is specified based on the specification pattern stored in the index switch register (a "register switching pattern" to be described later).

In this case, when the "extension" is "1100" or "1110", address modification is performed based on the content specified in the "index" while the instruction is repeated the number of times specified in the vector instruction; and the value of the register specified in the "base" is updated when the number of repetitions is completed.

Thus, when repeatedly performing loading or storage using multiple load instructions or store instructions, the register specified in the "base" is automatically updated. Therefore, it is not necessary to update the address in the "base" with a different instruction each time an instruction is issued, and the instruction can be immediately executed.

In FIG. 8, when the "extension" is "1101" or "1111", the address is similarly updated as done when the "extension" is "1100" or "1110", respectively. However, if the extension is "1101" or "1111", then execution of the instruction is finished without updating the value of the register specified in the "base", after the instruction repetition number has been completed.

Description will be now made on a vector processor according to this embodiment.

Figure 9:
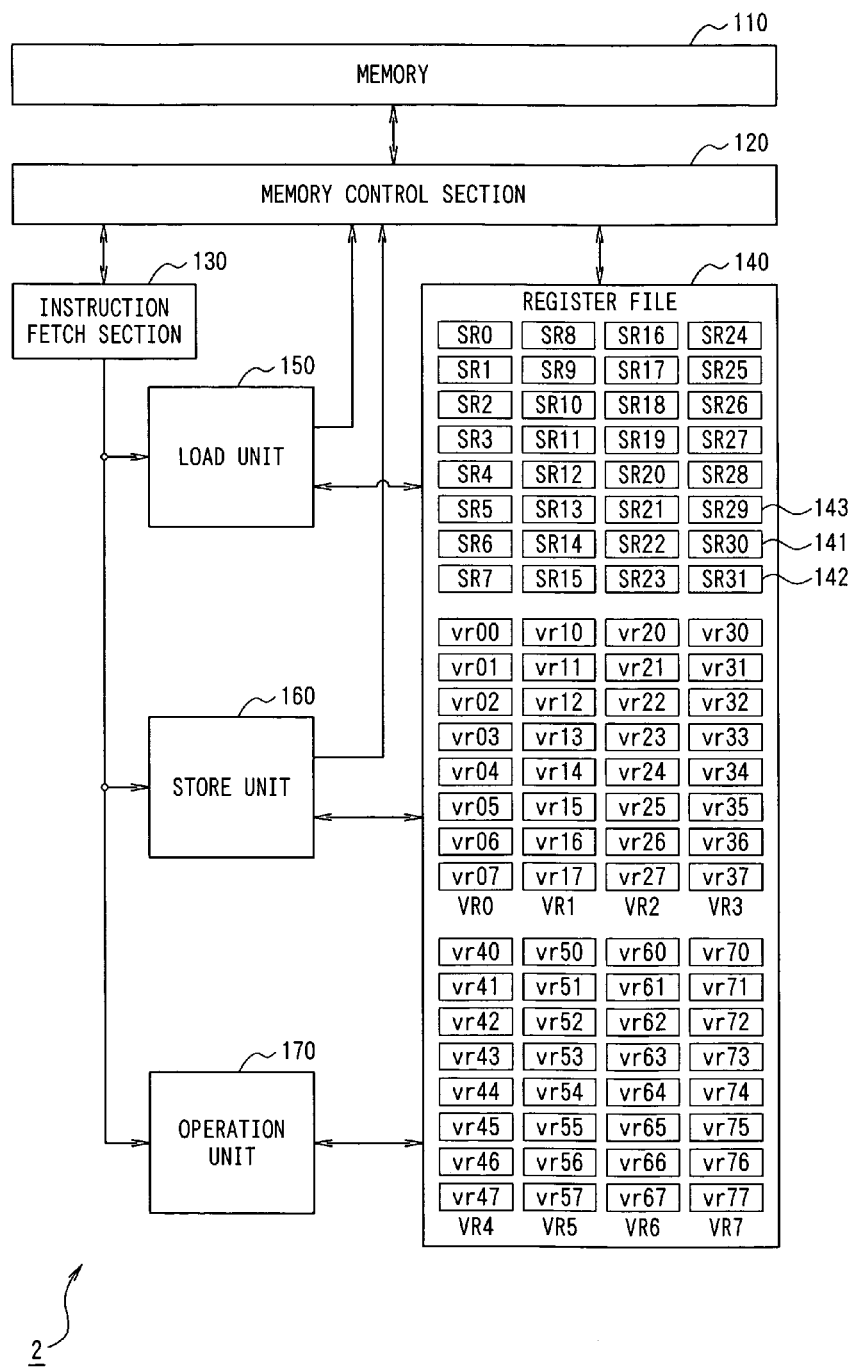
FIG. 9 shows the configuration of a vector processor 2 according to the embodiment.

FIG. 9 shows the configuration of a vector processor 2 according to this embodiment.

In FIG. 9, the configuration of the vector processor 2 is similar to the configuration of the vector processor 1 in the first embodiment except that a register file 140 includes subindex registers 141 and 142, and an index switch register 143. Therefore, description will be made only on the subindex registers 141 and 142 and the index switch register 143 and, as for the other sections, the corresponding sections in FIG. 4 are to be referred to.

The subindex registers 141 and 142 comprises a scalar register or a vector register (assumed to be scalar registers SRs 30 and 31 here) included in the register file 140. A predetermined index vector is stored in each of the subindex registers 141 and 142.

The index switch register 143 comprises a scalar register 140 (assumed to be a scalar register SR29 here) included in the register file and stores data (hereinafter referred to as a "register switching pattern") indicating which data should be selected as an index address among data included in the index register and the subindex registers 141 and 142.

Specifically, the register switching pattern is data for selecting any one of the four areas including the upper sixteen bits and the lower sixteen bits of either the subindex register 141 or the subindex register 142, and the upper sixteen bits and the lower sixteen bits of the I register shown in FIG. 11 to be described later.

Figure 10:
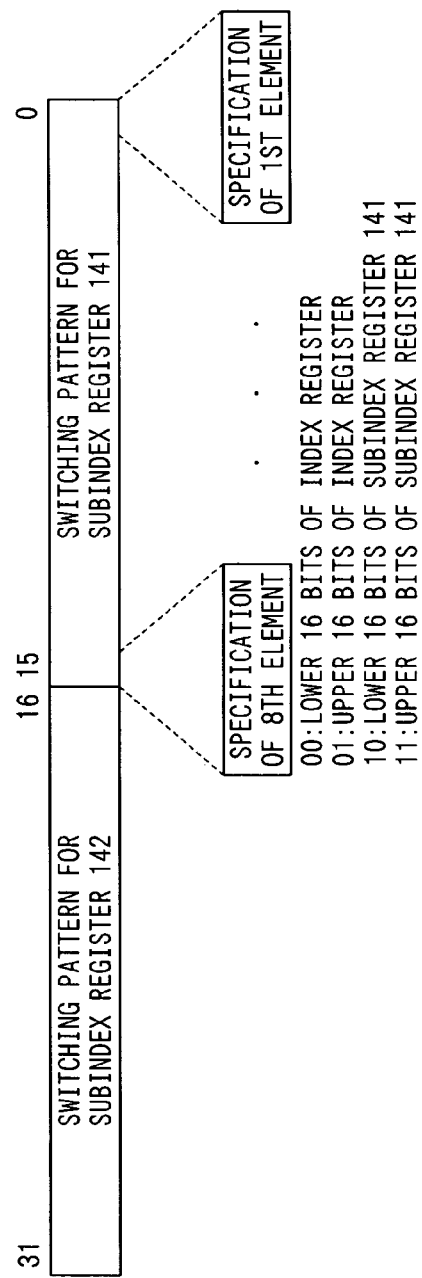
FIG. 10 shows the data configuration of a register switching pattern.

FIG. 10 shows the data configuration of a register switching pattern.

In FIG. 10, in the upper half of the register switching pattern, there is stored a switching pattern for the case when the subindex register 141 is selected, and in the lower half of the register switching pattern, there is stored a switching pattern for the case when the subindex register 142 is selected.

Figure 11:
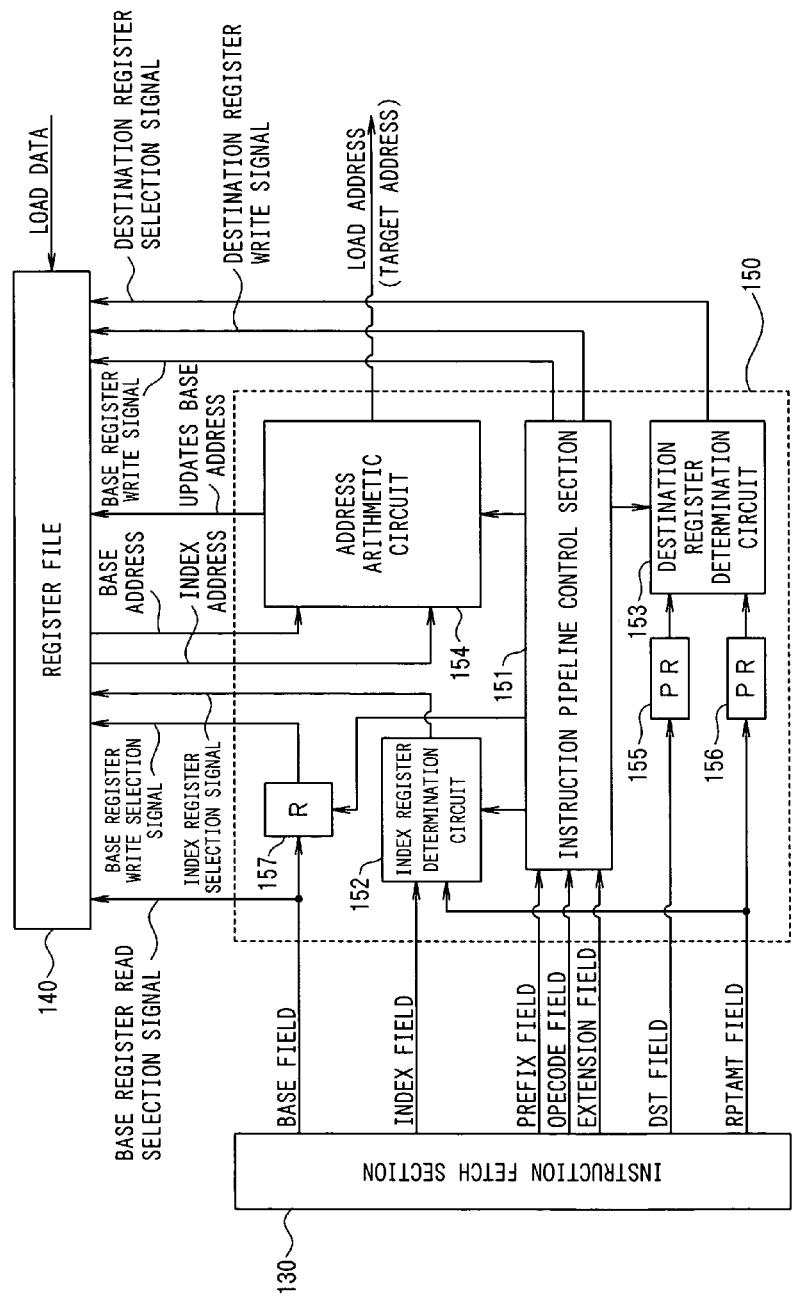
FIG. 11 is a block diagram showing the internal configuration of a load unit 150.

FIG. 11 is a block diagram showing the internal configuration of a load unit 150.

In FIG. 11, the internal configuration of the load unit 150 is similar to the internal configuration of the load unit 50 in the first embodiment except for the features of an instruction pipeline control section 151 and an address arithmetic circuit 154. Therefore, description will be made only on the instruction pipeline control section 151 and the address arithmetic circuit 154, and, as for the other sections, the description of the corresponding sections in FIG. 5 is to be referred to.

The instruction pipeline control section 151 controls the entire load unit 150. The instruction pipeline control section 151 causes the address arithmetic circuit 154 (more specifically, an MUX 154g) to select any of the subindex addresses of the subindex registers 141 and 142 based on the code of the extension field included in an instruction code, and causes the register switching pattern of the upper half or the lower half of the index switch register 143 in the register file 140 to be stored in a J register 154h to be described later.

The address arithmetic circuit 154 calculates an address on a memory 110 to be targeted by a load instruction (a load address) from the base address and an index address (an address specified by the index field) inputted from the register file 140, addresses stored in the subindex registers 141 and 142 (hereinafter referred to as "subindex addresses") and a register switching pattern stored in the index switch register 143, based on the direction by the instruction pipeline control section 151.

Description will be now made on the configuration of the address arithmetic circuit 154 shown in FIG. 11.

Figure 12:
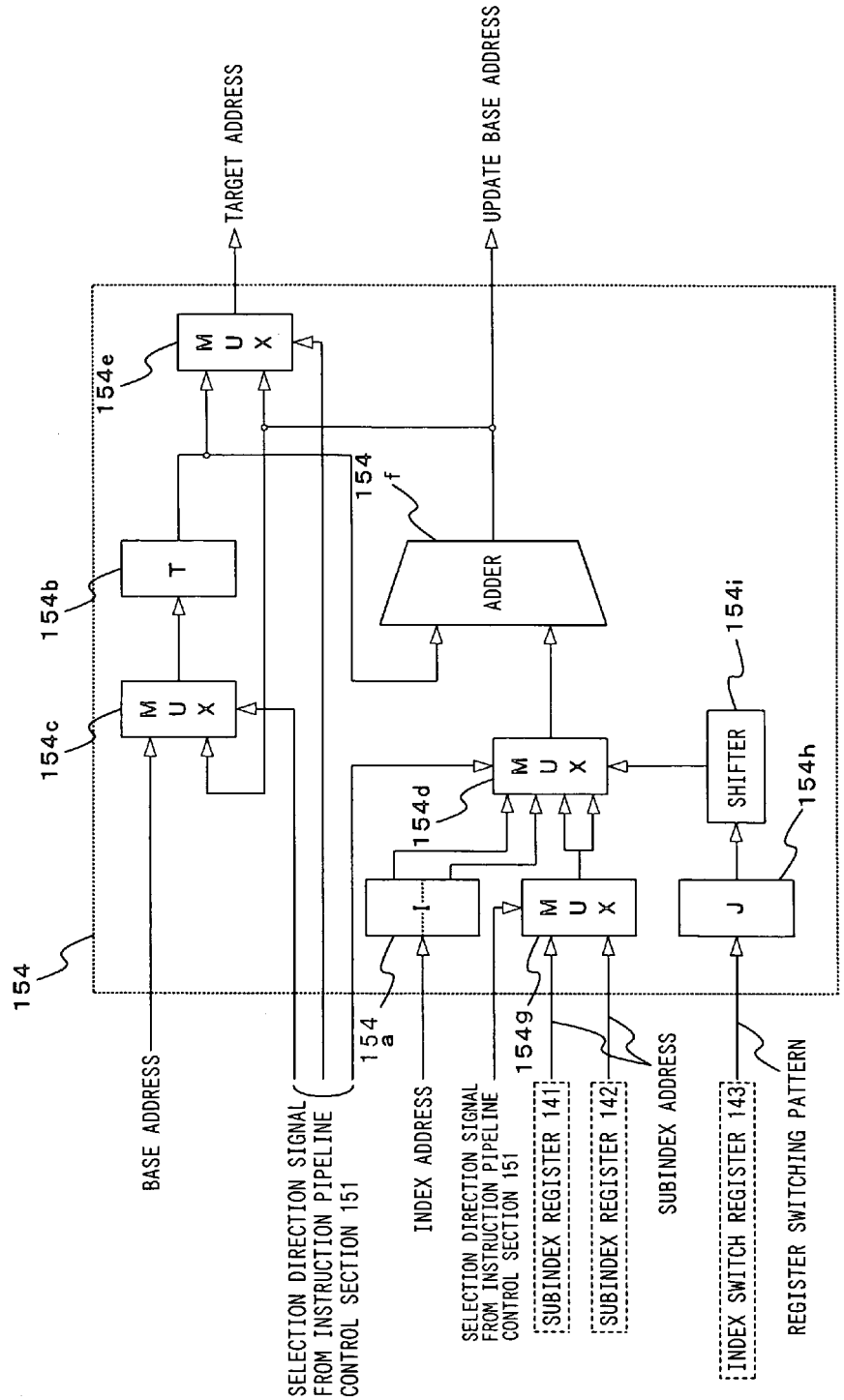
FIG. 12 shows a configuration example for an address arithmetic circuit 154.

FIG. 12 shows a configuration example for the address arithmetic circuit 154.

In FIG. 12, the configuration of the address arithmetic circuit 154 is similar to the address arithmetic circuit 54 in the first embodiment except for multiplexers (MUX) 154d and 154g, a J register 154h and a shifter 154i. Therefore, description will be made only on the MUX 154d and 154g, the J register 154h and the shifter 154i, and, as for the other sections, the corresponding sections in FIG. 6 are to be referred to.

The MUX 154d selects any of the upper and lower addresses of an index address inputted from the I register 154a and the upper and lower addresses of a subindex address inputted from the MUX 154g to be described later, and outputs it to an adder 154f. In this case, the MUX 154d selects any of the upper and lower addresses of the inputted index address and subindex address based on a direction signal inputted from a shifter 154i to be described later.

The MUX 154g selects any of subindex addresses inputted from the subindex registers 141 and 142 and outputs it to the MUX 154d. In this case, the MUX 154g selects any of subindex addresses based on a selection direction signal inputted from the instruction pipeline control section 151.

The J register 154h temporarily stores index register selection data inputted from the register file 140.

The shifter 154i receives a register switching pattern from the J register 154h, and outputs a signal for specifying an address to be selected by the MUX 154d based on the register switching pattern each one cycle.

Operations will be now described below.

The operation of the entire vector processor 2 will be described first with reference to FIG. 9.

When the vector processor 2 performs processing, an instruction code is read into the instruction fetch section 130 from the memory 110 via the memory control section 120.

The instruction code is outputted from the instruction fetch section 130 to each of the load unit 150, the store unit 160 and the operation unit 170.

When the instruction code is inputted, each of the load unit 150, the store unit 160 and the operation unit 170 decodes the instruction code, and executes the instruction only when the instruction is relevant to the unit.

Here, description will be made on the case where the instruction code is a load instruction, with reference to FIG. 11.

When the "opcode" of the instruction code indicates a load instruction (more specifically, when the prefix code is "000"), the load unit 150 operates.

The load unit 150 outputs the code of the base field received from the instruction fetch section 130 to the register file 140 as a base register read selection signal (a signal for selecting the base register to read data).

From the register file 140 which has received the base register read selection signal, the base address value stored in the register specified by the base register read selection signal is inputted to the load unit 150.

The base address value inputted from the register file 140 is inputted to the address arithmetic circuit 154.

The index register determination circuit 152 receives the codes of the index field and the repeat amount field inputted by the instruction fetch section 130. The index register determination circuit 152 judges whether the instruction code is a vector instruction or a scalar instruction based on the direction from the instruction pipeline control section 151. If the instruction code is a vector instruction, the index register determination circuit 152 sequentially outputs the same number of index register selection signals as the number of element data shown by the "repeat amount" to the register file 140. In this case, if the register specified by the index register selection signal is a vector register, then predetermined selection signals for identifying respective element registers in the specified vector register are outputted.

From the register file 140 to which the index register selection signals have been inputted, the index address values from the registers indicated by the index register selection signals are sequentially inputted to the address arithmetic circuit 154.

The instruction pipeline control section 151 outputs the addresses of the subindex registers 141 and 142 and the index switch register 143 to the register file 140. The subindex address values are also sequentially inputted to the address arithmetic circuit 154 at the same time when the index address values are inputted to the address arithmetic circuit 154.

Receiving the index address values and subindex address values, the address arithmetic circuit 154 selects any particular area among the index addresses and subindex addresses based on the register switching pattern, and calculates a load address based on the base address value and the value stored in the selected area, and outputs it to the memory control section 120. The operation of the address arithmetic circuit 154 will be described later.

The codes of the destination field and the repeat amount field inputted by the instruction fetch section 130 are stored in the PRs 155 and 156 once to adjust timing in pipeline processing, and then inputted to the destination register determination circuit 153.

The destination register determination circuit 153 then outputs destination register selection signals to the register file 140 in synchronization with the data loaded from the memory 110.

In the register file 140, the data loaded from the memory 110 is then sequentially stored in predetermined destination registers.

Furthermore, in the case of the post register update addressing, an update base address outputted from the address arithmetic circuit 154 is written to the base register.

Thus, the code of the base field is stored in the register 157; the code outputted from the register 157 is used as a base register write selection signal (a signal for selecting the base register to write data); and the data of the base register is updated in response to input of a base register write signal (a signal for directing writing to the base register).

The operation of the address arithmetic circuit 154 will be now described.

Description will be now made on the case of the index modification addressing first.

In the index modification addressing, the base address value is stored in the T register 154*b* via the MUX 154*c* in the cycle "1".

The index address value is stored in the I register 154*a*, and the upper half or lower half of the register switching pattern is stored in the J register 154*h*.

Then, in the cycle "2", the least significant two bits in the register switching pattern (the upper or lower half) stored in the J register 154*h* is outputted to the MUX 154*d* by the shifter 154*i*. The MUX 154*d* selects any of the upper and lower sixteen-bit data of the subindex address inputted via the MUX 154*g* based on the two-bit data inputted by the shifter 154*i*, and outputs it to the adder 154*f*. The adder 154*f* adds the base address value of the T register 154*b* and the address value outputted from the MUX 154*d*, and outputs it as a target address (a load address) via the MUX 154*e*.

In and after the third cycle, while the base address value is retained in the T register 154*b*, each two bits from the least significant bit of the register switching pattern (the upper or lower half) stored in the J register 154*h* is sequentially outputted by the shifter 154*i*. The addresses outputted from the MUX 154*d* are sequentially added with the base address by the adder 154*f*.

The instruction pipeline control section 151 to which the code of the extension field has been inputted controls the MUX 154*g*, selects either the upper or lower half data of the register switching pattern based on the code of the extension field and causes it to be stored in the J register 154*h* then to realize the extended specifications for the index modification addressing shown in FIG. 7.

That is, if the "extension" is "0000", then the data stored in the I register 154*a* (thirty-two bit data, here) is selected by the MUX 154*d* and immediately inputted to the adder 154*f*.

If the "extension" is "0100", then the lower sixteen bits of the I register 154*a* is sign-extended, and the obtained thirty-two bit data is selected by the MUX 154*d* and inputted to the adder 154*f*.

If the "extension" is "0110", then the upper sixteen bits of the I register 154*d* is sign-extended, and the obtained thirty-two bit data is selected by the MUX 154*d* and inputted to the adder 154*f*.

Description will be now made on the case of the post register update addressing.

In the case of the post register update addressing, the base address value is stored in the T register 154*b* via the MUX 154*c* in the cycle "1".

The index address value is stored in the I register 154*a*, and the upper or lower half data of the register switching pattern is stored in the J register 154*h* based on the direction by the instruction pipeline control section 151.

In the cycle "2", the base address value in the T register 154*b* is immediately outputted as a target address (a load address) via the MUX 154*e*.

The base address value in the T register 154*b* is also outputted to the adder 154*f* at the same time, and added with the address value outputted from the MUX 154*d*.

The result of the addition by the adder 154*f* is stored in the T register 154*b* via the MUX 154*c*, and the value stored in the T register 154*b* as a base address is updated.

In and after the third cycle, each two bits from the least significant bit of the register switching pattern (the upper or lower half) stored in the J register 154*h* is sequentially outputted by the shifter 154*i*, and the output from the T register 154*b* is outputted as a target address and the value stored as a base address in the T register 154*b* is updated similar to the cycles "1" and "2".

After that, at the same time when the target address for the last element data targeted by the load instruction being executed is outputted, the output from the adder 154*f* is outputted to the register file 140 as an update base address.

In the register file 140, at the time specified by a base register write signal, the update base address is stored in a register specified by a base register write selection signal inputted together with the base rite signal.

The instruction pipeline control section 151 to which the code of the extension field has been inputted controls the MUX 154*g*, selects either the upper or lower half data of the register switching pattern based on the code of the extension field and causes it to be stored in the J register 154*h* then to realize the extended specifications for the index modification addressing shown in FIG. 8.

That is, if the "extension" is "0000", then the data stored in the I register 154*a* (thirty-two bit data, here) is selected by the MUX 154*d* and immediately inputted to the adder 154*f*.

If the "extension" is "0100", then the lower sixteen bits of the data stored in the I register 154*a* is selected by the MUX 154*d*, and sign-extended thirty-two bit data is inputted to the adder 154*f*.

If the "extension" is "0110", then the upper sixteen bits of the data stored in the I register 154*a* is selected by the MUX 154*d*, and sign-extended thirty-two bit data is inputted to the adder 154*f*.

If the "extension" is "1100", then either the lower sixteen bits or the upper sixteen bits of each of the data stored in the I register 154*a* and the data stored in the subindex register 141, which is the data indicated by the register switching pattern, is sequentially selected by the MUX 154*d*, and sign-extended thirty-two bit data is inputted to the adder 154*f*.

If the "extension" is "1110", then either the lower sixteen bits or the upper sixteen bits of each of the data stored in the I register 154*a* and the data stored in the subindex register 142, which is the data indicated by the register switching pattern, is sequentially selected by the MUX 154*d*, and sign-extended thirty-two bit data is inputted to the adder 154*f*.

If the "extension" is "0101", "0111", "1101" or "1111", the feature extension is similarly performed as done when the "extension" is "0100", "0110", "1100" or "1110", respectively. However, the instruction pipeline control section 151 does not output a base register write signal and controls update of the base register not to be done.

As described above, in the vector processor 2 according to this embodiment, an element register of a vector register or a scalar register specified in the "index" is divided into multiple areas; different registers storing an index vector (the subindex registers 141 and 142) are provided and similarly divided into multiple areas for use. A particular index vector is acquired by selecting any divided area of the register specified in the "index" or the provided different registers.

Thus, it is possible to store substantially more index vectors in a small number of registers, and therefore register resources can be efficiently used.

The vector processor 2 is provided with the index switch register 143. It is possible to arbitrarily specify either the upper area or the lower area of the index register and the subindex registers 141 and 142 for each element to which address modification is performed based on a register switching pattern stored in the index switch register 143.

Accordingly, when executing one instruction, it can be dynamically changed which area should be selected among the areas of the index register and the subindex registers 141 and 142, thereby enabling the index vector obtained by specifying an area to be further diversified.

That is, according to the present invention, indirect index vector reference can be more efficiently performed.

Though it has been described in this embodiment that a register switching pattern is stored in the index switch register 143, it may be included in the index field of an instruction code.

Figure 13:
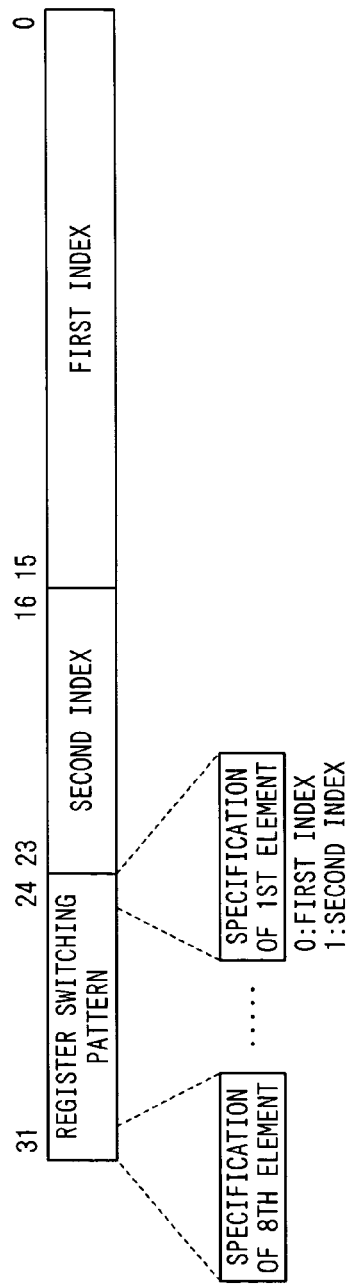
FIG. 13 shows the data configuration when a register switching pattern is included in the index field of an instruction code.

FIG. 13 shows the data configuration when a register switching pattern is included in the index field of an instruction code.

In FIG. 13, the index field includes a register switching pattern and addresses indicating areas in which the first and second indexes are stored, respectively (for example, the upper and lower sixteen bits of the index register).

For each of eight elements to which address modification is performed, whether address modification is to be performed or not is arbitrarily specified with any of the two indexes.

In this case, the configuration of the address arithmetic circuit 154 in FIG. 12 is as described below.

Figure 14:
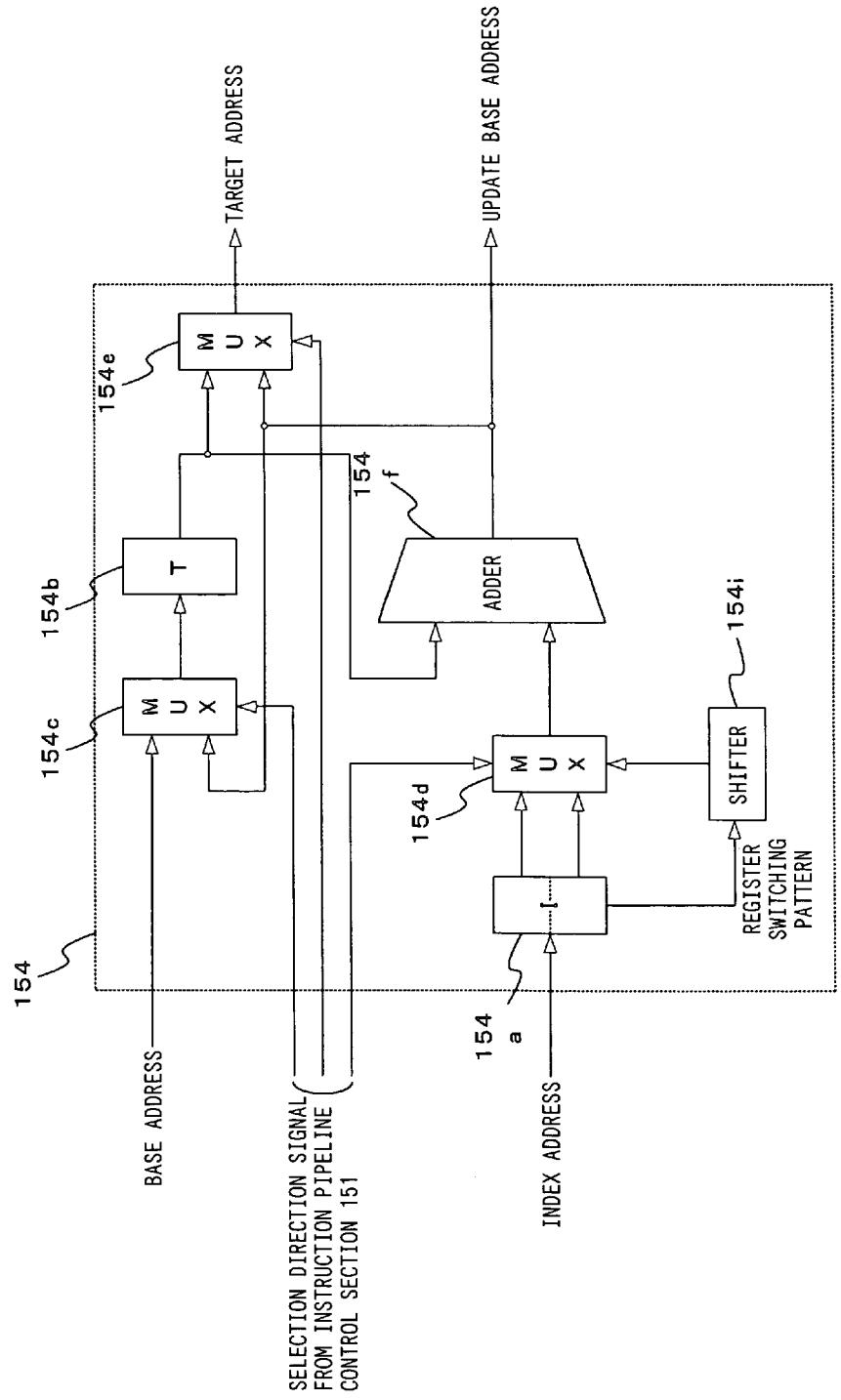
FIG. 14 shows the configuration of the address arithmetic circuit 154 when a register switching pattern is included in the index field of an instruction code.

FIG. 14 shows the configuration of the address arithmetic circuit 154 when the register switching pattern is included in the index field of an instruction code.

In FIG. 14, since the register switching pattern is included in the instruction code, there is not provided a register corresponding to the index switch register 143. The register switching pattern and addresses at which the first and second indexes are stored are inputted to the I register 154a via the register file 140.

The inputted register switching pattern is inputted to the shifter 154i, and a signal for selecting either of the two indexes stored in the I register 154a to the MUX 154d for each element to which address modification is performed.

According to this configuration, the index vector obtained by specifying an area can be diversified without providing the index switch register 143.

What is claimed is:

1. A method for referring to an address of vector data, the method being for referring to a memory address to read or write vector data with the use of an index vector, wherein an element storage register for storing an element of the index vector is divided into multiple areas; a particular code is stored in each of the areas; and multiple index vectors may be generated with the use of the code stored in a particular area of each element storage register of the index vector.

2. The method for referring to an address of vector data according to claim 1, wherein
each area of the element storage register stores a code indicating a relative address to a reference base address of the index vector; and
a target address, a memory address to be referred to, is calculated based on the code in an area selected from the divided areas of each element storage register and the base address.

3. The method for referring to an address of vector data according to claim 2, wherein the index vector is stored in a vector register, and a code indicating the relative address is stored in each area obtained by dividing each element register of the vector register.

4. The method for referring to an address of vector data according to claim 1, wherein
each area of the element storage register stores a code indicating a relative address to a reference base address of the index vector; and
a target address, a memory address to be referred to, is calculated based on the code in an area selected from the divided areas of each element storage register and the base address, and the calculated target address is set as a new reference base address.

5. The method for referring to an address of vector data according to claim 4, wherein a code indicating the relative address is stored in a scalar register as the element storage register, and the code indicating the relative address is stored in each area of the scalar register.

6. The method for referring to an address of vector data according to claim 1 wherein the area to be selected from the divided areas is dynamically changed during execution of a vector instruction for reading or writing of the vector data.

7. The method for referring to an address of vector data according to claim 6, wherein a specification pattern for specifying the area to be selected from the divided areas of the element storage register is stored in a predetermined register, and a particular index vector is generated by specifying any of the divided areas based on the specification pattern.

8. The method for referring to an address of vector data according to claim 1, wherein a first register including the element storage register storing a first index vector element and a second register including the element storage register storing a second index vector element are provided, and multiple index vectors may be generated with the use of the code stored in a particular area of each of the first and second registers.

9. The method for referring to an address of vector data according to claim 2, wherein the area to be selected from the divided areas is dynamically changed during execution of a vector instruction for reading or writing of the vector data.

10. The method for referring to an address of vector data according to claim 3, wherein the area to be selected from the divided areas is dynamically changed during execution of a vector instruction for reading or writing of the vector data.

11. The method for referring to an address of vector data according to claim 4, wherein the area to be selected from the divided areas is dynamically changed during execution of a vector instruction for reading or writing of the vector data.

12. The method for referring to an address of vector data according to claim 5, wherein the area to be selected from the divided areas is dynamically changed during execution of a vector instruction for reading or writing of the vector data.

13. The method for referring to an address of vector data according to claim 2, wherein a first register including the element storage register storing a first index vector element and a second register including the element storage register storing a second index vector element are provided, and multiple index vectors may be generated with the use of the code stored in a particular area of each of the first and second registers.

14. The method for referring to an address of vector data according to claim 3, wherein a first register including the element storage register storing a first index vector element and a second register including the element storage register storing a second index vector element are provided, and multiple index vectors may be generated with the use of the code stored in a particular area of each of the first and second registers.

15. The method for referring to an address of vector data according to claim 4, wherein a first register including the element storage register storing a first index vector element and a second register including the element storage register storing a second index vector element are provided, and multiple index vectors may be generated with the use of the code stored in a particular area of each of the first and second registers.

16. The method for referring to an address of vector data according to claim 5, wherein a first register including the element storage register storing a first index vector element and a second register including the element storage register storing a second index vector element are provided, and multiple index vectors may be generated with the use of the code stored in a particular area of each of the first and second registers.

17. The method for referring to an address of vector data according to claim 6, wherein a first register including the element storage register storing a first index vector element and a second register including the element storage register storing a second index vector element are provided, and multiple index vectors may be generated with the use of the code stored in a particular area of each of the first and second registers.

18. The method for referring to an address of vector data according to claim 7, wherein a first register including the element storage register storing a first index vector element and a second register including the element storage register storing a second index vector element are provided, and multiple index vectors may be generated with the use of the code stored in a particular area of each of the first and second registers.

19. A vector processor for referring to a memory address to read or write vector data with the use of an index vector, the vector processor comprising:
   an element storage register for storing an element of an index vector; wherein
   the element storage register is divided into multiple areas, and a particular code is stored in each of the areas; and
   multiple index vectors may be generated with the use of the code stored in a particular area of each element storage register.

20. The vector processor according to claim 19, wherein a first register including the element storage register storing a first index vector element and a second register including the element storage register storing a second index vector element are provided, and multiple index vectors may be generated with the use of the code stored in a particular area of each of the first and second registers.

* * * * *